(12) United States Patent
Nichols et al.

(10) Patent No.: US 11,541,599 B2
(45) Date of Patent: Jan. 3, 2023

(54) 3-D PRINTING COMPONENTS USING TWO-LIGHT SOURCES TO CONTROL LOCATION OF SOLIDIFICATION

(71) Applicant: Ford Global Technologies, LLC, Dearborn, MI (US)

(72) Inventors: Mark Nichols, Saline, MI (US); Christopher Seubert, New Hudson, MI (US); Chelsea Cates, Canton, MI (US); Kevin Richard John Ellwood, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 17/045,210

(22) PCT Filed: Apr. 4, 2018

(86) PCT No.: PCT/US2018/026021
§ 371 (c)(1),
(2) Date: Oct. 5, 2020

(87) PCT Pub. No.: WO2019/194798
PCT Pub. Date: Oct. 10, 2019

(65) Prior Publication Data
US 2021/0162670 A1    Jun. 3, 2021

(51) Int. Cl.
*B29C 64/282* (2017.01)
*B33Y 10/00* (2015.01)
(Continued)

(52) U.S. Cl.
CPC .......... *B29C 64/282* (2017.08); *B29C 64/135* (2017.08); *B29C 64/268* (2017.08);
(Continued)

(58) Field of Classification Search
None
See application file for complete search history.

(56) References Cited

U.S. PATENT DOCUMENTS

| 4,041,476 | A | * | 8/1977 | Swainson | .............. | B01J 19/121 |
| | | | | | | 365/119 |
| 5,310,581 | A | * | 5/1994 | Schmidt | .................. | G03F 7/039 |
| | | | | | | 427/558 |

(Continued)

OTHER PUBLICATIONS

P.S. Vincett, M.R.V. Sahyun, in Encyclopedia of Physical Science and Technology (Third Edition), 2003, Photographic Processes and Materials, p. 111, 1. Processes (Year: 2003).*

(Continued)

*Primary Examiner* — Leith S Shafi
*Assistant Examiner* — Tiffany Yu Huang
(74) *Attorney, Agent, or Firm* — Burris Law, PLLC

(57) ABSTRACT

A device and method of forming a three-dimensional component includes filling a reservoir (26) with a volume of curable resin (30), the resin configured to undergo a first reaction to form a first product when exposed to light (42) of a first wavelength and to undergo a second reaction to form a second product when exposed to light (62) of a second wavelength. The presence of the first and second products at a common location in the resin causes a third reaction that results in a solid polymer at the common location. The method further includes directing a first light source (34) of the first wavelength into the reservoir, directing a second light source (54) of the second wavelength into the reservoir such that the first and second light sources intersect at a first predetermined location (78) within the reservoir, and allowing the third reaction to form the solid polymer at the first predetermined location.

18 Claims, 3 Drawing Sheets

(51) Int. Cl.
*B33Y 30/00* (2015.01)
*B33Y 50/02* (2015.01)
*B29C 64/393* (2017.01)
*B29C 64/135* (2017.01)
*B29C 64/268* (2017.01)

(52) U.S. Cl.
CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 6,197,843 B1 * | 3/2001 | Rose | C04B 35/111 524/816 |
| 2015/0202805 A1 | 7/2015 | Saruhashi et al. | |
| 2016/0271875 A1 | 9/2016 | Brown, Jr. | |

OTHER PUBLICATIONS

International Search Report of the International Searching Authority for PCT/US2018/026021 dated Nov. 30, 2018.

\* cited by examiner

3-D PRINTING COMPONENTS USING TWO-LIGHT SOURCES TO CONTROL LOCATION OF SOLIDIFICATION

FIELD

The present disclosure relates to generally to 3-D printing, and more specifically to 3-D printing components using two-light sources to control the location of solidification.

BACKGROUND

The statements in this section merely provide background information related to the present disclosure and may not constitute prior art.

Additive manufacturing (AM), also referred to as 3D printing, is a manufacturing technique currently used to produce prototype and low volume parts by sequential deposition and solidification of a resinous material in a spatially defined location, such that the component is gradually assembled and typically grows in one dimension. While a number of AM technologies currently exist, stereolithography (SLA) is one of the most commercially used types that makes use of ultraviolet light (UV) curable resins.

UV curable resins typically require a formulation that allows for rapid polymerization upon exposure to a specific wavelength of light, followed by immediate cessation of the curing when that one wavelength is removed. These polymerization reactions are typically based on acrylate or methacrylate functional polymers, which may be urethanes, polyesters, or polyethers. In addition to the polymer, these formulae often contain photoinitiators (PIs) that, upon absorption of UV light, undergo rapid bond cleavage to generate a catalyst and initiate polymerization. UV curing is typically rapid and can transform liquid resins to solids on the time scale of a second.

In order to 3D print with UV curing resins, the liquid resin is typically cured layer-by-layer. The desired prototype is typically generated in a CAD program, which cuts the part into a series of substantially 2-D cross-sectional layers of appropriate thickness. A UV laser is then rastered over the surface of the printing liquid, which solidifies that layer in the shape of the object's 2-D cross section. The solidified layer is then indexed down a certain distance, fresh resin is wiped over the surface, and the next 2-D layer is cured on top of the previous layer, but along the same plane as the first layer was cured. As further layers are cured, the solidified part continues to be lowered and submerged into the resin bath. When the part is complete, it is removed from the bath and rinsed to remove uncured resin. One variation on this approach uses digital light processing (DLP) systems to project a complete layer onto the surface of the bath instead of using a raster movement. Another variation involves the use of a transparent and semi-permeable window on the bottom of the bath followed by indexing the part upwards out of the bath instead of lowering the part into the bath. In all of these methods, the part is formed (i.e., the resin is solidified) only along a stationary 2-D plane within the resin and the part is indexed relative to that 2-D plane so that the next 2-D cross section of the part will align with the 2-D plane.

While useful for some applications, the typical 3-D printing processes can have some drawbacks. One such drawback can be tumbling or movement of the parts within the resin if supports are not built into the 3-D printed part. Furthermore, resin can be wasted due to washing the completed part. Some other drawbacks can be that the layer-by-layer approach can reduce part fidelity, the indexing of the part can restrict the rate of printing, the typical resins that can be used may be limited to a number of costly proprietary resins, and the durability of typical 3D printed resins can be less than desired.

These issues with 3D printing of components are addressed by the present teachings which include a fundamentally different apparatus and method of controlling the locus and rate of reaction.

SUMMARY

In one form, a method of forming a three-dimensional component includes filling a reservoir with a volume of curable resin, the resin configured to undergo a first reaction to form a first product when exposed to light of a first wavelength and to undergo a second reaction to form a second product when exposed to light of a second wavelength. The presence of the first and second products at a common location in the resin causes a third reaction that results in a solid polymer at the common location. The method further includes directing a first light source of the first wavelength into the reservoir, directing a second light source of the second wavelength into the reservoir such that the first and second light sources intersect at a first predetermined location within the reservoir, and allowing the third reaction to form the solid polymer at the first predetermined location.

According to a further form, the method further includes adjusting at least one of the first light source and the second light source so that the first and second light sources intersect at a second predetermined location within the resin, and allowing the third reaction to form the solid polymer at the second predetermined location.

According to a further form, the second predetermined location is adjacent to the first predetermined location such that solidified material at the second predetermined location is joined to solidified material at the first predetermined location.

According to a further form, the first and second light sources are beam light sources.

According to a further form, at least one of the first light source and the second light source is a planar light source.

According to a further form, the other of the first light source and the second light source is a beam light source.

According to a further form, the third reaction includes a cascade that uses a photoactive catalyst. The first reaction includes the photoactive catalyst undergoing excitation by light of the first wavelength, but requiring a separate photogenerated activator to induce polymerization. The second reaction creates the second photogenerated activator.

According to a further form, the resin includes a catalyst that is activated by exposure to light of the first wavelength.

According to a further form, the resin includes a catalyst that is activated by exposure to a combination of light of the first and second wavelengths.

According to a further form, the first reaction includes a first catalyst that is configured to interact with light of the first wavelength and is activated upon exposure to light of the first wavelength. The first catalyst requires a second photogenerated reagent to form a final activator and begin a cure cascade. The second reaction results in the second photogenerated reagent.

According to a further form, the third reaction includes a photo-mediated polymerization scheme utilizing a single catalyst. The first reaction includes the catalyst being activated when exposed to light of the first wavelength. The second reaction includes terminal functionality protection on a monomer or oligomer using a photolabile protecting group that disconnects upon irradiation by light of the second wavelength.

According to a further form, the third reaction includes a cascade that uses protection of terminal monomer or oligomer functionality with a photolabile protecting group. The first reaction includes the photolabile protecting group undergoing a conformational change upon irradiation by light of the first wavelength, but requiring a separate photogenerated activator to disconnect completely and expose an active end for polymerization. The second reaction creates the separate photogenerated activator.

According to a further form, the third reaction includes a cascade that uses a photoactive catalyst. The first reaction includes the photoactive catalyst undergoing activation by light of the first wavelength, but requiring a separate photogenerated reagent to induce polymerization at a rate sufficiently rapid to overcome inhibition by an external inhibitor. The second reaction creates the photogenerated reagent.

In another form, a method of forming a component includes filling a reservoir with curable resin comprising first and second photoactive species, directing a first light source of a first wavelength into the reservoir, directing a second light source of a second wavelength into the reservoir such that the first and second light sources intersect at a predetermined location within the reservoir, and reacting the first and second photoactive species to solidify the resin at the predetermined location.

In another form, an apparatus for 3D printing an article includes a reservoir, a volume of resin disposed within the reservoir, a first light source, a second light source, and a controller. The resin is configured to undergo a first reaction to form a first product when exposed to light of a first wavelength and to undergo a second reaction to form a second product when exposed to light of a second wavelength. Presence of the first and second products at a common location in the resin causes a third reaction that results in a solid polymer at the common location. The first light source is configured to emit light of the first wavelength. The second light source is configured to emit light of the second wavelength. The controller is configured to selectively operate the first and second light sources so that light from the first light source intersects light from the second light source at predetermined locations within the resin.

According to a further form, the first and second light sources are beam light sources.

According to a further form, at least one of the first light source and the second light source is a planar light source.

According to a further form, the other of the first light source and the second light source is a beam light source.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
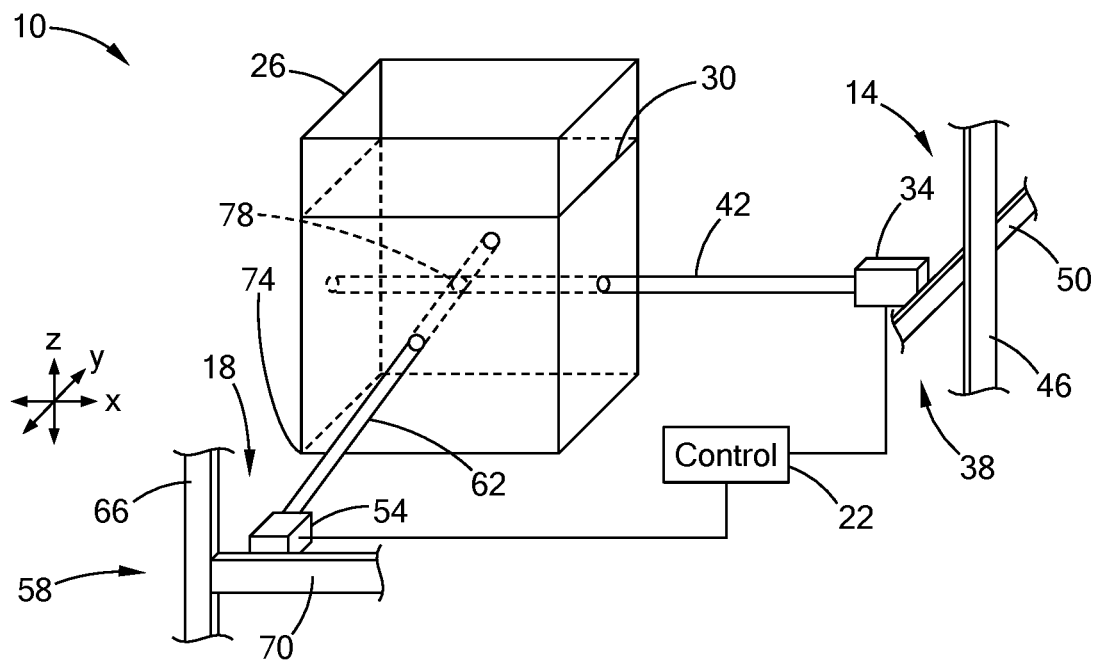
FIG. 1 is a perspective view of an additive manufacturing apparatus in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, an additive manufacturing apparatus 10 is illustrated. The additive manufacturing apparatus 10 includes a first light device 14, a second light device 18, a control module 22, and a reservoir 26 filled with a resin 30. The resin 30 is a liquid material generally configured to undergo solidification only at locations in the reservoir where both a first wavelength of light and a second, different wavelength of light are present. The resin 30 is described in more detail below. The reservoir 26 is a container having a plurality of walls configured to hold a volume of the resin 30 therein. In the example provided, the reservoir 26 is a generally cuboid shape, though the reservoir 26 can be any suitable shape, including polygonal or cylindrical. The reservoir 26 can be made of any suitable material such as glass or plastic. At least one side of the reservoir 26 is configured to permit light from the first light device 14 to enter into the reservoir 26 and at least one side of the reservoir 26 is configured to permit light from the second light device 18 to enter into the reservoir 26, as explained below. In the example provided, the reservoir 26 is a glass or clear polycarbonate material, though other configurations can be used.

The first light device 14 includes a first light source 34 and a first positioning device 38. The first light source 34 is generally configured to emit light of a first wavelength. Alternatively, the first light source 34 can be configured to emit light within a first predetermined range of wavelengths. The first light source 34 can be any suitable light source capable of limiting the range of wavelengths emitted to a single wavelength or first predetermined range of wavelengths. In one example, the first light source 34 is a laser of a specific spectrum range. In another example, the first light source 34 produces light across a broad range of wavelengths, but includes a filter (not specifically shown) that limits emission of the light from the first light source 34 so that the first light source 34 only emits light of the first wavelength or within the first predetermined range of wavelengths which is narrower than the broad range. The first wavelength or first predetermined range of wavelengths can be within the visible light spectrum or can be outside of the visible light spectrum. For ease of description herein, the first wavelength and the first predetermined range of wavelengths are generally referred to herein as the first type of light or the first light. In the example provided, the first light source 34 is a beam light source that emits the first light as a first beam 42 of light, though other configurations can be used.

The first positioning device 38 generally orients the first light source 34 so that the first light source 34 can emit the first light into the reservoir 26. The first positioning device 38 is configured to adjust the location that the first light passes through the reservoir 26 so that the first light can be directed to desired locations within the reservoir 26. In the example provided, the first positioning device 38 includes a vertical track 46 and a horizontal track 50. Additional vertical and/or horizontal tracks or supports (not shown) can be used to improve stability. The first light source 34 is mounted to the first positioning device 38 so that the vertical track 46 can move the first light source 34 vertically (i.e., along the Z axis as shown), while the horizontal track 50 can move the first light source horizontally (i.e., along the Y axis as shown). In the example provided, the first light source 34 emits the first beam 42 along the Y direction, though other configurations can be used.

In an alternative configuration, not specifically shown, the first positioning device 38 can adjust the angle and/or focus of the light emitted from the first light source 34 so that the first light can enter the reservoir 26 at different angles through the reservoir 26. As such, the first positioning device 38 can alternatively or additionally include mirrors (not shown), and/or lenses (not shown), and/or motors (not shown) configured to pivot the first light source 34 to adjust the focus and/or adjust the angle at which the emitted light enters the reservoir 26.

The second light device 18 includes a second light source 54 and a second positioning device 58. The second light source 54 is generally configured to emit light of a second wavelength. Alternatively, the second light source 54 can be configured to emit light within a second predetermined range of wavelengths. In the example provided, the second wavelength and second predetermined range of wavelengths are different from the first wavelength and first predetermined range of wavelengths and do not overlap on the electromagnetic spectrum. The second light source 54 can be any suitable light source capable of limiting the range of wavelengths emitted to a single wavelength or second predetermined range of wavelengths. In one example, the second light source 54 is a laser of a specific spectrum range. In another example, the second light source 54 produces light across a broad range of wavelengths, but includes a filter (not specifically shown) that limits emission of the light from the second light source 54 so that the second light source 54 only emits light of the second wavelength or within the second predetermined range of wavelengths which is narrower than the broad range. The second wavelength or second predetermined range of wavelengths can be within the visible light spectrum or can be outside of the visible light spectrum. For ease of description herein, the second wavelength and the second predetermined range of wavelengths are generally referred to herein as the second type of light or the second light. In the example provided, the second light source 54 is a beam light source that emits the second light as a second beam 62 of light, though other configurations can be used.

The second positioning device 58 generally orients the second light source 54 so that the second light source 54 can emit the second light into the reservoir 26. The second positioning device 58 is configured to adjust the location that the second light passes through the reservoir 26 so that the second light can be directed to desired locations within the reservoir 26. In the example provided, the second positioning device 58 includes a vertical track 66 and a horizontal track 70. The second light source 54 is mounted to the second positioning device 58 so that the vertical track 66 can move the second light source 54 vertically (i.e., along the Z axis as shown), while the horizontal track 70 can move the second light source horizontally (i.e., along the X axis as shown). In the example provided, the second light source 54 emits the second beam 62 along the X direction, though other configurations can be used.

In an alternative configuration, not specifically shown, the second positioning device 58 can adjust the angle and/or focus of the light emitted from the second light source 54 so that the second light can enter the reservoir 26 at different angles through the reservoir 26. As such, the second positioning device 58 can alternatively or additionally include mirrors (not shown), and/or lenses (not shown), and/or motors (not shown) configured to pivot the second light source 54 to adjust the focus and/or adjust the angle at which the emitted light enters the reservoir 26.

Returning to the example provided, the first positioning device 38 and the second positioning device 58 are configured so that the first and second lights can intersect at desired locations within the resin 30 in the reservoir 26. In the example provided, the first positioning device 38 positions the first light source 34 such that the first light enters the reservoir 26 through a first side of the reservoir 26, while the second positioning device 58 positions the second light source 54 such that the second light enters the reservoir 26 through a second or different side of the reservoir 26. In an alternative configuration, not specifically shown, the first and second positioning devices 38, 58 can be configured such that the first and second lights enter the reservoir 26 through the same side, though at different angles relative to the reservoir 26.

The control module 22 is in electrical communication with and configured to control operation of the first and second positioning devices 38, 58 and the first and second light sources 34, 54. The control module 22 is configured to receive input data representative of a three-dimensional part. In one example, the control module can receive data in the form of a three-dimensional computer model of a part and can convert that three-dimensional model into appropriate X, Y, and Z coordinates. In an alternative example, the control module 22 can receive data in the form of X, Y, and Z coordinates for points of the three-dimensional part, or other data derived from the three-dimensional computer model. One example of data derived from a three-dimensional model includes two-dimensional cross-sections of the three-dimensional part. The X, Y, and Z coordinates of the three-dimensional part correspond to X, Y, and Z coordinates within the resin 30 in the reservoir 26. In the example provided, a corner 74 of the reservoir 26 represents the zero location or origin (0, 0, 0) for the X, Y, and Z coordinates, though the coordinate system can be arranged in any suitable manner and does not need to have its zero location at the corner 74 of the reservoir 26.

In the example provided, the control module 22 is configured to output control signals to the first positioning device 38 to move the first light source 34 in the Y and Z directions so that the first light passes through the X, Y, and Z coordinates of the three-dimensional part. The control module 22 is configured to output control signals to the second positioning device 58 to move the second light source 54 in the X and Z directions so that the second light passes through the X, Y, and Z coordinates of the three-dimensional part. The control module 22 is configured to control the first and second light devices 14, 18 so that the first and second lights intersect within the resin 30 at predetermined X, Y, and Z coordinates (e.g., location of intersection 78 shown).

The resin 30 and chemistry involved is described in greater detail below, but generally, the resin 30 is configured to solidify at locations where both the first and second light are present (i.e., the intersection 78 of the first and second lights). The control module 22 can subsequently adjust the positioning of the first and second light sources 34, 54 so that subsequent intersections of the first and second lights correspond to different X, Y, and Z coordinates until the first and second lights have intersected through all desired coordinates of the three-dimensional part so that the resin 30 has solidified into the three-dimensional part. Subsequent intersections of the first and second lights can be adjacent to previous intersections such that the newly solidified material is joined to the previously solidified material.

Figure 2:
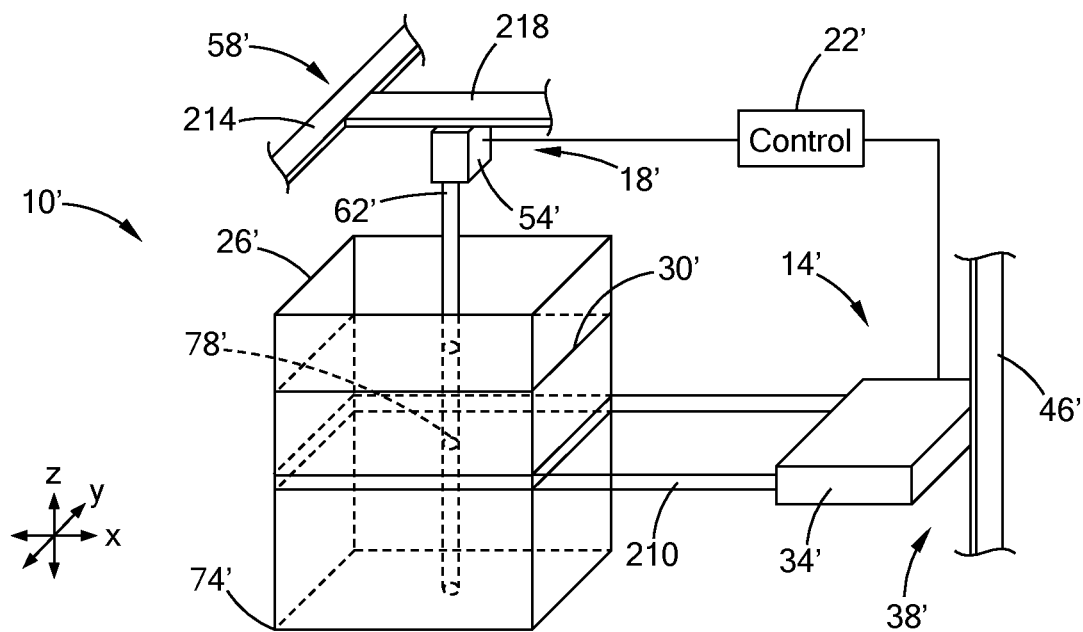
FIG. 2 is a perspective view of an additive manufacturing apparatus of a second construction in accordance with the teachings of the present disclosure.

With additional reference to FIG. 2, an additive manufacturing apparatus 10' of a second configuration is illustrated. The additive manufacturing apparatus 10' is similar to the additive manufacturing apparatus 10 (FIG. 1), except as otherwise shown or described herein. Accordingly, similar elements are identified with similar, but primed, reference numerals and only differences are described in detail herein. In the example provided, the first light source 34' is a planar light source that emits the first light as a first plane 210 of light instead of the beam light source of FIG. 1. The first plane 210 of light enters and passes through the resin 30' as a plane of light of the first wavelength or first predetermined range of wavelengths. In the example provided, the first positioning device 38' only includes the vertical track 46' since the first plane 210 extends in the horizontal direction across the entire width of the reservoir 26', though other configurations can be used. In the example provided, the first light source 34' emits the first plane 210 along the X direction, though other configurations can be used.

In the example provided, the second light source 54' is similar to the second light source 54 (FIG. 1) and emits a second beam 62' of light. The second positioning device 58' is configured to position the second light source 54' so that the second beam 62' passes through the first plane 210 at an angle relative to the first plane 210 so that the first and second lights intersect at a predetermined location (e.g., intersection 78'). In the example provided, the second beam 62' is perpendicular to the first plane 210, though other configurations can be used. In the example provided, the second positioning device 58' includes two horizontal tracks 214, 218 configured to move the second light source 54' in the X and Y directions and the second beam 62' is emitted along the Z direction, though other configurations can be used. Similar to the control module 22 (FIG. 1), the control module 22' is configured to control operation of the first and second light devices 14' and 18'.

In another example, not specifically shown, the additive manufacturing apparatus can include more than one first light device 14 or 14' and/or more than one second light device 18 or 18'. The additional light devices (not shown) can be configured to provide multiple intersection points of the two wavelengths (or two predetermined ranges of wavelengths) of light within the resin 30. Thus, multiple points in the resin 30 corresponding to the three-dimensional model can be solidified simultaneously. In another example, not specifically shown, the first light source can be a planar light source similar to the first light source 34' (FIG. 2) and the second light source can emit light in a two-dimensional pattern, e.g., a projection of a two-dimensional cross-section of the three-dimensional part, to solidify a two-dimensional cross-section at a time. The planar first light source can then be moved up to correspond to the next two-dimensional cross-section layer of the part and the second light source can project the next two-dimensional cross-section into the resin.

Thus, the additive manufacturing apparatus (e.g., 10 or 10') of the present disclosure permits an entire three-dimensional part to be formed by solidifying resin in a reservoir without moving the reservoir and without moving the part within the reservoir during the forming process.

The resin 30 can be any suitable resin configured to solidify only at locations where the first and second lights intersect. The resin 30 is generally configured to undergo a first reaction when exposed to the first light and to undergo a second reaction when exposed to the second light, and to undergo a generally irreversible reaction to polymerize and solidify when exposed to both the first and second lights.

Figure 3:
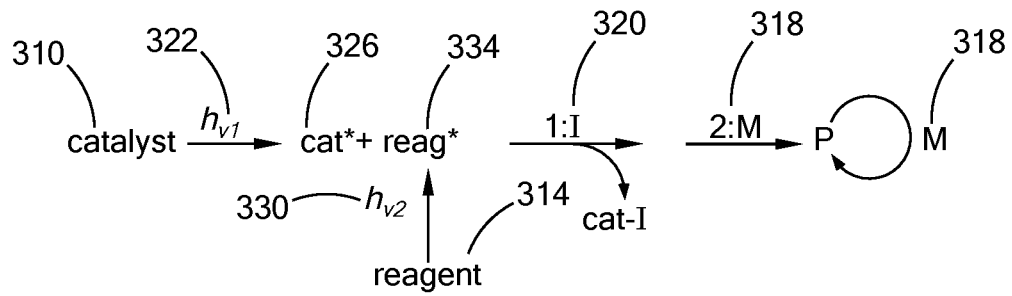
FIG. 3 is a chemical formula for polymerization of a first resin used with the additive manufacturing apparatus of FIG. 1 or 2 in accordance with the teachings of the present disclosure.

With additional reference to FIG. 3, the resin 30 can include a photoactive catalyst 310, a secondary reagent 314, and a plurality of monomers 318. In the example provided, the resin 30 also includes an inhibitor 320 configured to inhibit polymerization of the monomers 318. The secondary reagent 314 may include a second catalyst, a photogenerated activator, or a co-catalyst. Alternatively, the monomers 318 can be oligomers. The resin 30 can also include additional inactive ingredients. One such additional, inactive ingredient may be solvents (not shown) configured to help control the viscosity of the resin 30. In this example, the resin 30 is configured such that the polymerization reaction is a cascade that uses a photoactive catalyst.

In this example, when the catalyst 310 is exposed to the first light 322 (i.e., light of the first wavelength or first predetermined range of wavelengths), the catalyst 310 undergoes a first reaction wherein the product is an activated form of the catalyst (i.e., cat* 326). In the example provided, the first reaction is illustrated as being an irreversible reaction, but in some configurations the first reaction may be a reversible reaction. In the example provided, the catalyst 310 does not react or otherwise become activated when exposed to the second light 330 (i.e., light of the second wavelength or second predetermined range of wavelengths). When the first light 322 is removed from the resin 30, generation of the activated catalyst (cat* 326) ceases. In the example provided, the reaction from catalyst 310 to cat* 326 can occur over the timescale of micro-seconds or faster.

When the secondary reagent 314 is exposed to the second light, the secondary reagent 314 undergoes a second reaction wherein the product is an activated form of the secondary reagent (i.e., reag* 334). In the example provided, the second reaction is illustrated as being an irreversible reaction, but in some configurations the second reaction may be a reversible reaction. In the example provided, the secondary reagent 314 does not react or otherwise become activated when exposed to the first light 322. When the second light 330 is removed from the resin 30, the generation of the activated secondary reagent (reag* 334) ceases. In the example provided, the reaction from secondary reagent 314 to reag* 334 can occur over the timescale of micro-seconds or faster.

The activated catalyst (cat* 326) in the presence of the activated secondary reagent (reag* 344) can then catalyze polymerization of the monomers 318 in an irreversible reaction at a rate that overcomes the inhibition of the inhibitor 320. During the polymerization of the monomers 318, the monomers 318 can continue to cross-link and join to form a solid polymer until the first light 322 or the second light 330 is removed. Upon removal of the first light 322, the generation of cat* 326 ceases and the inhibitor 320 can inhibit further polymerization. Upon removal of the second light 330, the generation of reag* ceases and the inhibitor 320 can inhibit further polymerization. Upon removal of both the first and second lights 322, 330, the generation of cat* and reag* ceases and the inhibitor 320 can inhibit further polymerization. In the example provided, neither the catalyst 310, nor the secondary reagent 314 can catalyze the polymerization of the monomers 318 directly. In the example provided, neither the cat* 326, nor the reag* 334 can individually catalyze the polymerization of the monomers 318 without the other present. Thus, the resin 30 can be configured such that only when and where there is appropriate photon flux of both the first and second lights 322, 330 would reactivity occur faster than the inhibitor diffusion limit to cause solidified polymer at that location of sufficient photon flux.

One non-limiting example of the catalyst 310 and secondary reagent 314 is where both the catalyst 310 and secondary reagent 314 are radical photoinitiators, either a type I photoinitiator (such as 2-methyl-4'-(methylthio)-2-morpholinopropiophenone) or a type II photoinitiator (such as benzoin methyl ether) and donor molecule (such as 2-propanol) system. In this particular example, the first light 322 can be in the UV-C range of wavelengths (e.g., 100 nm-290 nm) and the second light 330 can be in the UV-B to UV-A range of wavelengths (e.g., 290 nm-400 nm), though other configurations can be used. In this particular example, the monomer 318 can be a molecule featuring a terminal acrylate, vinyl, keto- or aldehyde functionality, such as trimethylolpropane propoxylate triacrylate or diallyl maleate, and the inhibitor 320 can be a monomethyl ether quinone, though other configurations can be used.

Figure 4:
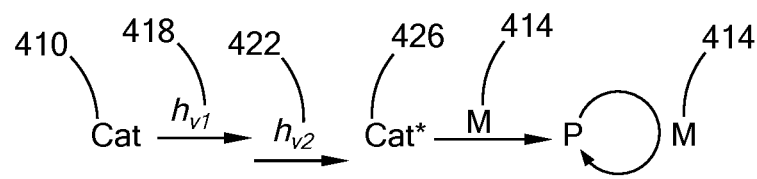
FIG. 4 is a chemical formula for polymerization of a second resin that can be used in the additive manufacturing apparatus of FIG. 1 or 2 in accordance with the teachings of the present disclosure.

With additional reference to FIG. 4, a chemical reaction of a different configuration of the resin 30 is illustrated. In this configuration, the resin 30 can include a photoactive catalyst 410 and a plurality of monomers 414. Alternatively, the monomers 414 can be oligomers. The resin 30 can also include additional inactive ingredients. One such additional, inactive ingredient may be solvents (not shown) configured to help control the viscosity of the resin 30. In this example, the catalyst 410 is configured such that when exposed to the first light 418 (i.e., light of the first wavelength or first predetermined range of wavelengths), but not exposed to the second light 422 (i.e., light of the second wavelength or second predetermined range of wavelengths), the catalyst 410 does not enter its activated state (i.e., cat* 426). In other words, the catalyst 410 undergoes a first reaction when exposed to the first light 418 wherein the product can be the catalyst 410 or an intermediary (not shown) that is not the cat* 426. Likewise, when exposed to the second light 422, but not exposed to the first light 418, the catalyst 410 does not enter its activated state (i.e., cat* 426). In other words, the catalyst 410 undergoes a second reaction when exposed to the second light 422 wherein the product can be the catalyst 410 or an intermediary (not shown) that is not the cat* 426. In the example provided, the first and second reactions are illustrated as being irreversible reactions, but in some configurations the first reaction and/or the second reaction may be reversible reactions.

When both the first light 418 and the second light 422 are present, the catalyst 410 reacts such that the product is the activated catalyst (i.e., cat* 426). The removal of the first light 418 or the second light 422 causes generation of the cat* 426 to cease. In the example provided, the reaction from catalyst 410 to cat* 426 can occur over the timescale of micro-seconds or faster. The cat* 426 can then catalyze polymerization of the monomers 414 in an irreversible reaction. During the polymerization of the monomers 414, the monomers can continue to cross-link and join to form a solid polymer until the first light 418 or the second light 422 is removed.

One non-limiting example of the catalyst 410 is a two-stage photobase generator that generates an appropriate base after absorption of photons of two different wavelengths. In this example, the first light 418 can be in the UV-A to visible range of wavelengths (e.g., 315 nm-600 nm), and the second light 422 can be in the UV-C to UV-A range of wavelengths (e.g., 200 nm-350 nm), while not being the same wavelength as the first light 418, though other configurations can be used. In this example, the monomers 414 can be an unsaturated terminal functionality (e.g., vinyl or acrylate), with a backbone that may be polyurethane, polyester, or similar, and a co-monomer that is a highly branched monomer (or oligomer) with terminal alcohol or thiol functionality, such as pentaerythritol Tetra(3-mercaptopropionate), i.e., "PETMP", though other configurations can be used.

Figure 5:
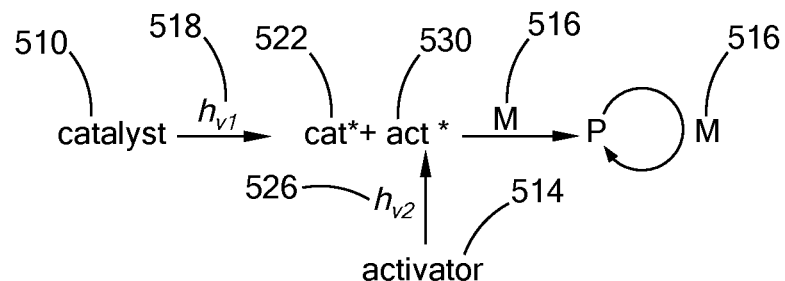
FIG. 5 is a chemical formula for polymerization of a third resin that can be used in the additive manufacturing apparatus of FIG. 1 or 2 in accordance with the teachings of the present disclosure.

With additional reference to FIG. 5, a chemical reaction of a different configuration of the resin 30 is illustrated. In this configuration, the resin 30 can include a photoactive catalyst 510, a photogenerated activator 514, and a plurality of monomers 516. Alternatively, the monomers 516 can be oligomers. The resin 30 can also include additional inactive ingredients. One such additional, inactive ingredient may be solvents (not shown) configured to help control the viscosity of the resin 30. In this example, when the catalyst 510 is exposed to the first light 518 (i.e., light of the first wavelength or first predetermined range of wavelengths), the catalyst 510 undergoes a first reaction wherein the product is an activated form of the catalyst (i.e., cat* 522). In the example provided, the first reaction is illustrated as being an irreversible reaction, but in some configurations the first reaction may be a reversible reaction. In the example provided, the catalyst 510 does not react or otherwise become activated when exposed to the second light 526 (i.e., light of the second wavelength or second predetermined range of wavelengths). When the first light 518 is removed from the resin 30, generation of the activated catalyst (cat* 522) ceases. In the example provided, the reaction from catalyst 510 to cat* 522 can occur over the timescale of micro-seconds or faster.

When the activator 514 is exposed to the second light 526, the activator 514 undergoes a second reaction wherein the product is an activated form of the activator (i.e., act* 530). In the example provided, the second reaction is illustrated as being an irreversible reaction, but in some configurations the second reaction may be a reversible reaction. In the example provided, the activator 514 does not react or otherwise become activated when exposed to the first light 518. When the second light 526 is removed from the resin 30, generation of act* 530 ceases. In the example provided, the reaction from activator 514 to act* 530 can occur over the timescale of micro-seconds or faster.

The cat* 522 in the presence of the act* 530 can then catalyze polymerization of the monomers 516 in an irreversible reaction. During the polymerization of the monomers 516, the monomers 516 can continue to cross-link and join to form a solid polymer until the first light 518 or the second light 526 is removed. In the example provided, neither the catalyst 510, nor the activator 514 can catalyze the polymerization of the monomers 516 directly. In the example provided, neither the cat* 522, nor the act* 530 can individually catalyze the polymerization of the monomers without the other present.

One non-limiting example of the catalyst 510 is a switchable photobase featuring an azobenzene moiety that, in the resting cis-conformation, protects a pendant amine base. In this example, upon irradiation with the first light 518, the azobenzene fragment experiences a cis-trans-conformational change to generate cat* 522, exposing the active pendant base. In this example, the first light 518 can be a wavelength of approximately 350 nm, though other configurations can be used. In this example, the activator 514 can be an alkyl halide initiator, such as ethyl α-bromophenyl acetate, and the second light 526 can be a wavelength of approximately 250 nm, though other configurations can be used. In this example, the monomer 516 can be a branched monomer with terminal acrylate or vinyl functionality, such as trimethylolpropane propoxylate triacrylate, or an oligomer with a polyurethane, polyether, or polyvinyl backbone, though other configurations can be used.

Figure 6:
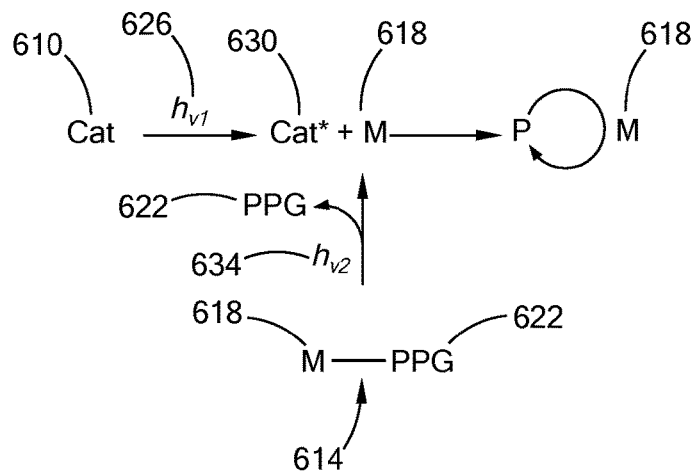
FIG. 6 is a chemical formula for polymerization of a fourth resin that can be used in the additive manufacturing apparatus of FIG. 1 or 2 in accordance with the teachings of the present disclosure.

With additional reference to FIG. 6, a chemical reaction of a different configuration of the resin 30 is illustrated. In this configuration, the resin 30 can include a photoactive catalyst 610 and a plurality of monomers, some of which may be protected monomers 614. Alternatively, the protected monomers 614 can be protected oligomers. The resin 30 can also include additional inactive ingredients. One such additional, inactive ingredient may be solvents (not shown) configured to help control the viscosity of the resin 30. The protected monomer 614 includes a monomer 618 that is attached to a photolabile protecting group 622. In this example, the resin 30 can be configured such that the polymerization reaction is a photomediated polymerization scheme utilizing a single photoactive catalyst. The photoactive catalyst 610 is activated in a first reaction when exposed to the first light 626 (i.e., light of the first wavelength or first predetermined range of wavelengths) such that the product is the activated form of the catalyst (i.e., cat* 630). In the example provided, the first reaction is illustrated as being an irreversible reaction, but in some configurations the first reaction may be a reversible reaction. In the example provided, the photoactive catalyst 610 does not react or otherwise become activated when exposed to the second light 634 (i.e., light of the second wavelength or second predetermined range of wavelengths). When the first light 626 is removed from the resin 30, generation of the activated catalyst (cat* 630) ceases. In the example provided, the reaction from catalyst 610 to cat* 630 can occur over the timescale of micro-seconds or faster.

The photolabile protecting group 622 offers terminal functionality protection to the monomer 618. When the protected monomer 614 is exposed to the second light 634, the photolabile protecting group 622 disconnects from the monomer 618 in a second reaction. In the example provided, the second reaction is illustrated as being an irreversible reaction, but in some configurations the second reaction may be a reversible reaction. When the second light 634 is removed from the resin 30, disconnection of the photolabile protecting group 622 from the monomer 618 ceases. In the example provided, the monomer 618 does not polymerize without presence of the activated catalyst (i.e., cat* 630). The presence of the cat* 630 with the deprotected monomer 618 results in the polymerization of the monomer 618. During the polymerization of the monomers 618, the monomers 618 can continue to cross-link and join to form a solid polymer until the first light 626 or the second light 634 is removed.

One non-limiting example of the photolabile protected monomer 614 is a branched thiol, such as pentaerithritol tetra (3-mercaptopropionate) ("PETMP"), protected with a thiol-appropriate photoactive protecting group, such as an o-nitrobenzyl or 9-phenylthioxanthyl group. In the example of the 9-phenylthioxanthyl group, the second light 634 can be in the UV-B region (e.g., 290 nm-320 nm), or can generally be in the UV region (e.g., 200 nm-400 nm), while being a different wavelength than the first light 626, though other configurations can be used. In this example, the catalyst 610 can be a switchable photobase featuring an azobenzene moiety that, in the resting cis-conformation, protects a pendant amine base. In this example, upon irradiation with the first light 626, the azobenzene fragment experiences a cis-/trans-conformational change to generate cat* 630, exposing the active amine base. In this example, the first light 626 can be a wavelength of approximately 350 nm, though other configurations can be used. In this example, the released monomer 618 can be a thiol terminal monomer, as discussed above, and a second comonomer (not shown) that can be a vinyl or acrylate terminal monomer or oligomer, such as diallyl maleate or 1,4-bis(acryloyl) piperazine, though other configurations can be used.

Figure 7:
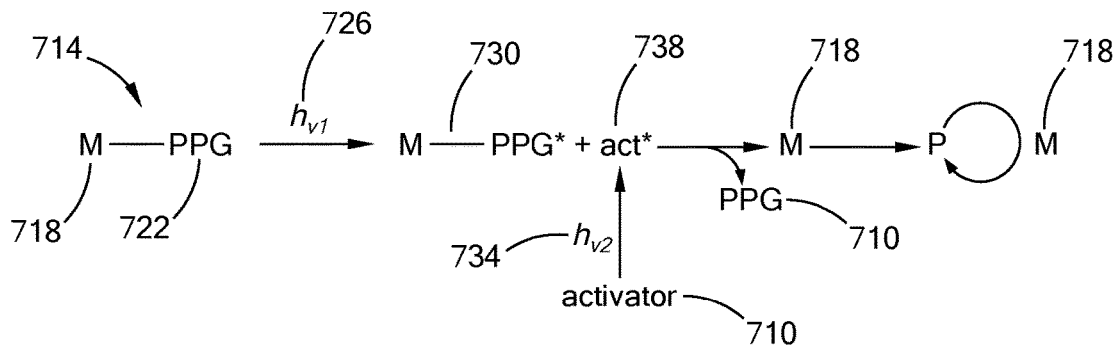
FIG. 7 is a chemical formula for polymerization of a fifth resin that can be used in the additive manufacturing apparatus of FIG. 1 or 2 in accordance with the teachings of the present disclosure.

With additional reference to FIG. 7, a chemical reaction of a different configuration of the resin 30 is illustrated. In this configuration, the resin 30 can include an activator precursor 710 and a plurality of monomers, some of which may be protected monomers 714. Alternatively, the protected monomers 714 can be protected oligomers. The resin 30 can also include additional inactive ingredients. One such additional, inactive ingredient may be solvents (not shown) configured to help control the viscosity of the resin 30. The protected monomer 714 include a monomer 718 that is attached to a photolabile protecting group 722. In this example, the resin 30 can be configured such that the polymerization reaction is a cascade that uses protection of terminal monomer functionality via the photolabile protecting group 722. When the protected monomer 714 is exposed to the first light 726 (i.e., light of the first wavelength or first predetermined range of wavelengths), the photolabile protecting group 722 does not disconnect from the monomer 718. Instead, the photolabile protecting group 722 undergoes an activation step (indicated by M-PPG* 730) in a first reaction. In the example provided, the first reaction is illustrated as being an irreversible reaction, but in some configurations the first reaction may be a reversible reaction. When the first light 726 is removed from the resin 30, activation of the photolabile protecting group 722 ceases. The photolabile protecting group 722 does not undergo activation in the presence of the second light 734 (i.e., light of the second wavelength or second predetermined range of wavelengths). In the example provided, the reaction from protected monomer 714 to M-PPG* 730 can occur over the timescale of milliseconds or faster. In the example provided, neither the protected monomer 714, nor the activated protected monomer M-PPG* 730 can polymerize directly.

When the activator precursor 710 is exposed to the second light 734, it undergoes a second reaction such that the product is the activator (i.e., act* 738). In the example provided, the second reaction is illustrated as being an irreversible reaction, but in some configurations the second reaction may be a reversible reaction. In the example provided, the activator precursor 710 does not react or otherwise become activated when exposed to the first light 726. When the second light 734 is removed from the resin 30, generation of act* 738 ceases. In the example provided, the reaction from activator precursor 710 to act* 738 can occur over the timescale of micro-seconds or faster.

The act* 738 causes an irreversible reaction with the M-PPG* 730 to strip the monomer 718 of the photolabile protecting group 722. In the example provided, the act* 738 does not strip the photolabile protecting group 722 if the photolabile protecting group 722 is not in its activated state. With the monomer 718 deprotected, irreversible polymerization of the monomer 718 can occur. During the polymerization of the monomers 718, the monomers 718 can continue to cross-link and join to form a solid polymer until the first light 726 or the second light 734 is removed, at which point no further unprotected monomers are being created.

One non-limiting example of the protected monomer 714 is a branched thiol monomer or oligomer, such as pentaerithritol tetra (3-mercaptopropionate) ("PETMP"), protected with a photolabile protecting group that undergoes an excitation or activation upon absorption of the first light 726, such as a 2-benzylbenzoic acid group. The first light 726 can be in the UV region of wavelengths, and in the example provided can be approximately 300 nm, though other configurations can be used. In this example, the activator 710 can be photobase generator capable of producing an electron donor, such as cyclohexylamine, though other configurations can be used. One example of this type of molecule is a 4,3',5'-trimethoxybenzoin carbamate protected cyclohexylamine, though other configurations can be used. In this example, the second light 734 can be in the UV to visible region of wavelengths, but different from the first light 726, such as approximately 350 nm, though other configurations can be used. In this example, a comonomer (not shown) can be present, such as an acrylate or olefin terminated monomer or oligomer, though other configurations can be used.

Figure 8:
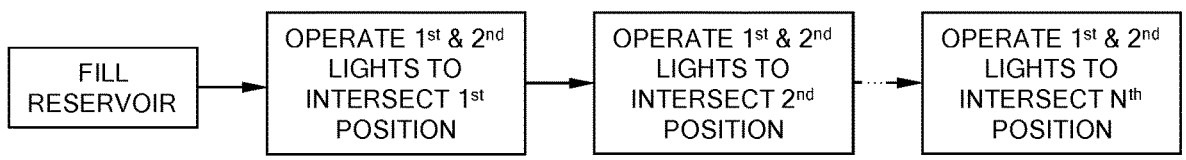
FIG. 8 is a flow chart of a method of forming a three-dimensional part using the additive manufacturing apparatus of FIG. 1 or 2.

Accordingly (and with additional reference to FIG. 8), the additive manufacturing apparatus (e.g., additive manufacturing apparatus 10 or 10') can be used to quickly and accurately form three-dimensional objects from a resin. The process, while explained in more detail above, generally includes filling a reservoir with the resin 30, inputting data representative of coordinates of a three-dimensional part into a controller, operating light sources so that light of two different wavelengths intersect at least one first predetermined location in the resin, allowing the resin to solidify at the first predetermined location, then repeating the operating of the light sources so that the light of two different wavelengths intersects at subsequent locations to solidify the resin at those subsequent locations until the entire three-dimensional part is solidified in the reservoir.

While some specific examples of chemical make-ups of resins are described above, other chemicals and/or light wavelengths can be used to achieve the desired reactions, while limiting dark cure (i.e., polymerization when both lights are not present).

The description of the disclosure is merely exemplary in nature and, thus, variations that do not depart from the substance of the disclosure are intended to be within the scope of the disclosure. Such variations are not to be regarded as a departure from the spirit and scope of the disclosure.

Although the terms first, second, third, etc. may be used herein to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example embodiments. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass tranistory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskel, Go, SQL, R, Lisp, Java®, Fortran, Perl, Pascal, Curl, OCaml, Javascript®, HTML5, Ada, Asp (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

What is claimed is:

1. A method of forming a three-dimensional component, the method comprising:
    filling a reservoir with a volume of curable resin, the resin configured to undergo a first reaction to form a first product when exposed to light of a first wavelength and to undergo a second reaction to form a second product when exposed to light of a second wavelength, wherein the presence of the first and second products at a common location in the resin causes a third reaction that results in a solid polymer at the common location;
    directing a first light source of the first wavelength into the reservoir;
    directing a second light source of the second wavelength into the reservoir such that the first and second light sources intersect at a first predetermined location within the reservoir; and
    allowing the third reaction to form the solid polymer at the first predetermined location;
    wherein one of the first and second products is a photolabile protecting group, and the third reaction includes the photolabile protecting group and the other of the first and second products to form the solid polymer.

2. The method of claim 1, further comprising:
    adjusting at least one of the first light source and the second light source so that the first and second light sources intersect at a second predetermined location within the resin; and
    allowing the third reaction to form the solid polymer at the second predetermined location.

3. The method of claim 2, wherein the second predetermined location is adjacent to the first predetermined location such that solidified material at the second predetermined location is joined to solidified material at the first predetermined location.

4. The method of claim 1, wherein the first and second light sources are beam light sources.

5. The method of claim 1, wherein at least one of the first light source and the second light source is a planar light source.

6. The method of claim 5, wherein the other of the first light source and the second light source is a beam light source.

7. The method of claim 1, wherein the third reaction includes a cascade that uses a photoactive catalyst, the first reaction includes the photoactive catalyst undergoing excitation by light of the first wavelength, but requiring a separate photogenerated activator to induce polymerization, wherein the second reaction creates the second photogenerated activator.

8. The method of claim 1, wherein the resin includes a catalyst that is activated by exposure to light of the first wavelength.

9. The method of claim 1, wherein the resin includes a catalyst that is activated by exposure to a combination of light of the first and second wavelengths.

10. The method of claim 1, wherein the first reaction includes a first catalyst that is configured to interact with light of the first wavelength and is activated upon exposure to light of the first wavelength, the first catalyst requiring a second photogenerated reagent to form a final activator and begin a cure cascade, wherein the second reaction results in the second photogenerated reagent.

11. The method of claim 1, wherein the third reaction includes a photo-mediated polymerization scheme utilizing a single catalyst, wherein the first reaction includes the catalyst being activated when exposed to light of the first wavelength, wherein the second reaction includes terminal functionality protection on a monomer or oligomer using the photolabile protecting group that disconnects upon irradiation by light of the second wavelength.

12. The method of claim 1, wherein the third reaction includes a cascade that uses protection of terminal monomer or oligomer functionality with the photolabile protecting group, wherein the first reaction includes the photolabile protecting group undergoing an activation upon irradiation by light of the first wavelength, but requiring a separate photogenerated activator to disconnect completely and expose an active end for polymerization, wherein the second reaction creates the separate photogenerated activator.

13. The method of claim 1, wherein the third reaction includes a cascade that uses a photoactive catalyst, the first reaction includes the photoactive catalyst undergoing activation by light of the first wavelength, but requiring a separate photogenerated reagent to induce polymerization at a rate sufficiently rapid to overcome inhibition by an external inhibitor, wherein the second reaction creates the photogenerated reagent.

14. A method of forming a component comprising:
  filling a reservoir with curable resin comprising first and second photoactive species, one of the first and second photoactive species being a photolabile protecting group;
  directing a first light source of a first wavelength into the reservoir;
  directing a second light source of a second wavelength into the reservoir such that the first and second light sources intersect at a predetermined location within the reservoir; and
  reacting the first and second photoactive species to solidify the resin at the predetermined location.

15. An apparatus for 3D printing an article, the apparatus comprising:
  a reservoir;
  a volume of resin disposed within the reservoir, the resin being configured to undergo a first reaction to form a first product when exposed to light of a first wavelength and to undergo a second reaction to form a second product when exposed to light of a second wavelength, wherein presence of the first and second products at a common location in the resin causes a third reaction that results in a solid polymer at the common location;
  a first light source configured to emit light of the first wavelength;
  a second light source configured to emit light of the second wavelength; and
  a controller configured to selectively operate the first and second light sources so that light from the first light source intersects light from the second light source at predetermined locations within the resin;
  wherein one of the first and second products is a photolabile protecting group, and the third reaction includes the photolabile protecting group and the other of the first and second products to form the solid polymer.

16. The apparatus of claim 15, wherein the first and second light sources are beam light sources.

17. The apparatus of claim 15, wherein at least one of the first light source and the second light source is a planar light source.

18. The apparatus of claim 17, wherein the other of the first light source and the second light source is a beam light source.

* * * * *